United States Patent Office 2,970,998
Patented Feb. 7, 1961

2,970,998

HALOGENATION OF CYANURIC ACID

Samuel W. Tribit, Hawthorne, N.Y., assignor to American Cyanamid Company, New York, N.Y., a corporation of Maine No Drawing. Filed Nov. 13, 1957, Ser. No. 696,028

4 Claims. (Cl. 260—248)

The present invention is concerned with a novel method for the preparation of N-halogeno triazines, particularly the halogeno isocyanuric acids. These compounds particularly the chlorides are known. The latter, for example, because of their readily-available chlorine content, are well suited for the preparation of dry bleaching compositions and the like. Commercially, an increasing interest is being shown in their production and use.

Unfortunately, no wholly satisfactory process for their production has been available. In the past, trichloro isocyanuric acid, for example, has been prepared by dissolving cyanuric acid in a dilute aqueous solution of caustic soda to form the sodium salt and then passing elemental chlorine into the solution. Product is formed as a precipitate. When chlorine addition is stopped, the reaction mixture is filtered or centrifuged, the solids being collected, washed and dried; the filtrate being recycled.

While this method seems simple and straightforward, unfortunately, it is not economically satisfactory for the production of halogenated isocyanuric acids on a commercial scale. For each mol of trichloro isocyanuric acid formed, there is also formed as a side product an excessive amount, often thirteen or more grams, of nitrogen trichloride. The hazardous nature of this by-product makes the procedure for collecting, washing and drying highly unsatisfactory.

There remains, then, a need for a less dangerous procedure. Such a procedure should be one which is capable of operation in available equipment, with a minimum of supervision and with a minimum formation of the by-product nitrogen trihalide. It is, therefore, the principal object of the present invention to provide such a process.

Surprisingly, these objects have been accomplished by a relatively simple modification of the above-described process. Its successful utilization has been based on the discovery that after the above-noted chlorination reaction is completed, the hydrogen ion content of the reaction mixture can be adjusted from the terminal value of about 4.5 to a value of from about 1.5 to 3.5 without adverse effect on the product isocyanurate. On the other hand, the nitrogen trihalides are much less stable under these conditions.

In the process of the present invention, therefore, as a first-stage, the previously-discussed halogenation procedure is employed in the usual way. Thereafter, according to the present invention, the terminal acid content is adjusted to a pH of from about 1.5 to about 3.5 and a sufficient time is then allowed for the nitrogen trihalide to decompose to the necessary extent. Thereafter the precipitated product may be collected, washed and dried in the conventional way, but with one marked difference. The content of nitrogen trihalide will be found to be reduced to a small fraction of the amount previously found.

During the actual halogenation no unusual precautions are necessary. The usual safety precautions as to corrosion resistance, venting and the like should be observed. Agitation is necessary for effective results. It should be adequate to thoroughly disperse the halogen in the reacting mixture. Reaction is exothermic and sufficient cooling capacity should be available to maintain the reaction temperature below about 20° C. Reaction should be carried out at temperatures of from about 0° to about 5° C. for best results.

Moreover, no unusual precautions are needed during the subsequent steps. The hydrogen ion content adjustment can be carried out with dilute mineral acid. The acid should be one which forms soluble products, compatible with the reaction mixture. In the case of halogenated products, this will usually be hydrochloric. Hydrobromic, sulfuric, acetic or phosphoric acids may be used, if so desired.

Sufficient time must be allowed for sufficient decomposition of the nitrogen trihalide to occur. This will vary with the contents of the soltuion and the size of the batch. It is also governed to some extent by the reaction temperature at which the decomposition is carried out. In general, a period of from about 10 minutes to about 60 minutes will be found adequate. For most purposes, some 20 to 40 minutes will be found to represent good practice. During this period, agitation is not necessary and generally should be discontinued.

The invention will be further illustrated in conjunction with the following examples which are intended as illustrative only and not by way of limitation. Unless otherwise noted, all parts are by weight.

Example 1

A slurry is prepared containing about 38.5–39.0 parts of cyanuric acid per 600 parts of water and to the agitated slurry is added about 41.5 parts of caustic soda in 125 parts of water for each 600 parts of original slurry. Thereafter, at a temperature of about 0°–5° C., elemental chlorine is pumped into the slurry until about 72 parts of chlorine is absorbed for each 38.5 parts of cyanuric acid added. At this point, the solution is adjusted to a pH of about 2.5 with dilute hydrochloric acid. And the mixture is held for 20 minutes without further agitation. Resultant slurry is filtered, collected solids washed with cold water and dried. Analysis of the solids indicated an 88.5 percent total yield having an active chlorine content of 84 percent. The nitrogen trichloride production was only about 2.5 grams per mol of cyanuric acid.

Example 2

To illustrate the result to be expected from the previous practice, the procedure of Example 1 is repeated, omitting the acid content adjustment and the waiting period and promptly collecting the precipitated product which on analysis indicated a nitrogen trichloride content increase of about 285 percent.

Conventional chlorination of other triazines such as melamine, ammeline, ammelide and the like, also are troubled with the production of by-product nitrogen trihalides. The procedure of the present invention is also effective in eliminating this problem to a large degree in these reactions.

I claim:
1. In the production of a N-chlorinated triazine selected from the group consisting of N-chlorinated cyanuric acid, N-chlorinated melamine, N-chlorinated ammeline and N-chlorinated ammelide by introducing elemental chlorine into a cold aqueous solution of an alkali metal salt of the triazine, and recovering the solid content comprising corresponding N-chlorinated triazine and nitrogen trichloride from the slurry thus formed, the improvement which comprises the steps of: adjusting the hydrogen ion content (pH) of said slurry prior to the separation of said solid content therein from the pH at- tained on completion of elemental chlorine addition to a pH value of from about 1.5 to 3.5; permitting the so-adjusted slurry to stand for from about 10 to 60 minutes, whereby the nitrogen trichloride content in said slurry is substantially decreased by decomposition; and thereafter recovering the so-purified N-chlorinated triazine from the resultant treated slurry.

2. A process according to claim 1 in which the triazine is cyanuric acid.

3. A process according to claim 2 in which the adjusted slurry is permitted to stand for a period of about 20–40 minutes.

4. A process according to claim 3 in which the adjusted slurry is maintained at a temperature of about 0°–5° C.

References Cited in the file of this patent

UNITED STATES PATENTS

| | | |
|---|---|---|
| 2,016,257 | Schmelkes et al. | Oct. 1, 1935 |
| 2,472,361 | Arsem | June 7, 1949 |
| 2,828,308 | Lorenz | Mar. 25, 1958 |

OTHER REFERENCES

Mellor: Comprehensive Treatise on Inorganic and Theoretical Chemistry, vol. 8, pp. 601–602 (1928 ed.), Longmans', Green and Co., New York.

The Merck Index, 6th Edition, pp. 680–681, Merck and Co., 1952.